US008688645B2

(12) United States Patent
Sadhwani

(10) Patent No.: US 8,688,645 B2
(45) Date of Patent: Apr. 1, 2014

(54) INCREMENTAL RESTORE OF DATA BETWEEN STORAGE SYSTEMS HAVING DISSIMILAR STORAGE OPERATING SYSTEMS ASSOCIATED THEREWITH

(75) Inventor: Dhiraj Sadhwani, Hyderabad (IN)

(73) Assignee: NetApp, Inc., Sunnyvale, CA (US)

( * ) Notice: Subject to any disclaimer, the term of this patent is extended or adjusted under 35 U.S.C. 154(b) by 173 days.

(21) Appl. No.: 12/956,116

(22) Filed: Nov. 30, 2010

(65) Prior Publication Data

US 2012/0136832 A1 May 31, 2012

(51) Int. Cl.
*G06F 7/22* (2006.01)
(52) U.S. Cl.
USPC ..................................................... 707/681
(58) Field of Classification Search
None
See application file for complete search history.

(56) References Cited

U.S. PATENT DOCUMENTS

| | | | | |
|---|---|---|---|---|
| 5,280,611 A * | 1/1994 | Mohan et al. ........................ 1/1 |
| 5,649,152 A * | 7/1997 | Ohran et al. ................... 711/114 |
| 5,835,953 A * | 11/1998 | Ohran ............................ 711/162 |
| 6,049,874 A * | 4/2000 | McClain et al. .............. 713/176 |
| 6,085,298 A * | 7/2000 | Ohran ............................ 711/162 |
| 6,185,577 B1 * | 2/2001 | Nainani et al. ........................ 1/1 |
| 6,233,589 B1 * | 5/2001 | Balcha et al. .................. 707/625 |
| 6,785,786 B1 * | 8/2004 | Gold et al. ..................... 711/162 |
| 6,957,362 B2 * | 10/2005 | Armangau ....................... 714/20 |
| 7,065,537 B2 * | 6/2006 | Cha et al. ....................... 707/648 |
| 7,373,364 B1 * | 5/2008 | Chapman ............................. 1/1 |
| 7,730,031 B2 * | 6/2010 | Forster .......................... 707/625 |
| 7,769,722 B1 * | 8/2010 | Bergant et al. ................ 707/681 |
| 7,769,723 B2 * | 8/2010 | Zheng et al. ................... 707/682 |
| 7,809,776 B1 * | 10/2010 | Witte et al. .................... 707/825 |
| 7,856,424 B2 * | 12/2010 | Cisler et al. ................... 707/654 |
| 7,873,601 B1 * | 1/2011 | Kushwah ....................... 707/654 |
| 7,958,169 B1 * | 6/2011 | Witte et al. .................... 707/825 |
| 8,019,730 B2 * | 9/2011 | Forster .......................... 707/667 |
| 8,019,731 B2 * | 9/2011 | Forster .......................... 707/667 |
| 8,027,958 B1 * | 9/2011 | Chapman ...................... 707/679 |
| 8,078,816 B1 * | 12/2011 | Thoppai et al. ............... 711/162 |
| 8,151,139 B1 * | 4/2012 | Gordon ........................... 714/15 |
| 8,200,638 B1 * | 6/2012 | Zheng et al. ................... 707/679 |
| 2002/0169740 A1 * | 11/2002 | Korn ................................. 707/1 |
| 2004/0220980 A1 * | 11/2004 | Forster .......................... 707/204 |
| 2004/0267714 A1 * | 12/2004 | Frid et al. .......................... 707/3 |
| 2005/0076264 A1 * | 4/2005 | Rowan et al. ..................... 714/6 |
| 2008/0222219 A1 * | 9/2008 | Varadarajan .................. 707/204 |
| 2010/0174685 A1 * | 7/2010 | Forster .......................... 707/667 |
| 2010/0257142 A1 * | 10/2010 | Murphy et al. ............... 707/681 |
| 2011/0004586 A1 * | 1/2011 | Cherryholmes et al. ...... 707/682 |
| 2011/0010345 A1 * | 1/2011 | Forster et al. ................. 707/661 |
| 2012/0130956 A1 * | 5/2012 | Caputo .......................... 707/679 |

* cited by examiner

*Primary Examiner* — Hung Q Pham
*Assistant Examiner* — Hubert Cheung
(74) *Attorney, Agent, or Firm* — Klein, O'Neill & Singh, LLP

(57) ABSTRACT

A method includes quiescing a file system of source storage system through a backup engine associated with the source storage system and a destination storage system and capturing, at the source storage system, a point-in-time image of the file system thereof through the backup engine. The method also includes sharing the captured point-in-time image of the file system of the source storage system with the destination storage system to enable the storage systems to have a common base data and negotiating between the storage systems for the common base data. Further, the method includes applying, to the common base data at the source storage system, a differential change corresponding to a difference between the common base data and a point-in-time image of the file system of the source storage system backed up at the destination storage system.

34 Claims, 8 Drawing Sheets

INCREMENTAL RESTORE OF DATA BETWEEN STORAGE SYSTEMS HAVING DISSIMILAR STORAGE OPERATING SYSTEMS ASSOCIATED THEREWITH

FIELD OF TECHNOLOGY

This disclosure relates generally to restoring data in storage systems and, more particularly, to a method, an apparatus, and/or a system of incrementally restoring data between storage systems having dissimilar storage operating systems associated therewith.

BACKGROUND

Backing up of data (e.g., remote back up) associated with a source storage system at a destination storage system may aid recovery of "lost" data at the source storage system. The "lost" data may signify data accidentally/erroneously deleted from the source storage system and/or data corrupted at the source storage system. The aforementioned backing up of the data may be performed using a backup engine (e.g., NetApp®'s SnapVault®) associated with the source storage system and the destination storage system.

When there is no difference between data associated with the source storage system and the data backed up at the destination storage system, save for a folder of data and/or a file accidentally deleted from the source storage system, an incremental restore process may be performed, whereby a differential data corresponding to the data accidentally deleted alone may be transferred from the destination storage system to the source storage system. The aforementioned incremental restore process may be possible when the source storage system and the destination storage system have the same storage operating systems associated therewith.

For example, when the source storage system is a third-party application server, the storage operating system associated therewith may be different from that of the destination storage system. Here, the granularity of source data at the destination storage system may be different from the granularity at the source storage system. Thus, even if a mere single file is deleted from the source storage system, an entire container associated with the single file may need to be restored.

The time consumed for the full restore may be large compared to the time consumed during a corresponding incremental restore process, if possible to perform. Moreover, as the source storage system and the destination storage system may be configured to communicate with each other through a computer network, bandwidth associated therewith may increase. Further, storage requirements at the source storage system may increase for the full restore process. The expenses associated with the aforementioned time increase and bandwidth/storage requirement increase during data recovery may be prohibitive for a concerned organization backing up data thereof at the destination storage system.

SUMMARY

Disclosed are a method, an apparatus, and/or a system of performing an incremental restore of data between storage systems having dissimilar storage operating systems associated therewith.

In one aspect, a method of restoring data associated with a source storage system configured to be backed up at a destination storage system to the source storage system includes quiescing a file system associated with the source storage system through a backup engine associated with the source storage system and the destination storage system and capturing, at the source storage system, a point-in-time image of the file system associated therewith through the backup engine. The source storage system and the destination storage system have different storage operating systems associated therewith.

The method also includes sharing the captured point-in-time image of the file system associated with the source storage system with the destination storage system to enable the source storage system and the destination storage system to have a common base data therein and negotiating between the source storage system and the destination storage system for the common base data therein. Further, the method includes applying, to the common base data at the source storage system, a differential change corresponding to a difference between the common base data at the destination storage system and a point-in-time image of the file system of the source storage system backed up at the destination storage system.

The point-in-time image of the file system of the source storage system backed up at the destination storage system is configured to be in an immediate temporal past relative to a back up of the data to be restored to the source storage system at the destination storage system and in a temporal past relative to the common base data at the destination storage system.

In another aspect, a method of performing an incremental restore of a differential data to a source storage system configured to have data associated therewith backed up at a destination storage system includes quiescing a file system associated with the source storage system through a backup engine associated with the source storage system and the destination storage system, capturing, at the source storage system, a point-in-time image of the file system associated therewith through the backup engine, and sharing the captured point-in-time image of the file system associated with the source storage system with the destination storage system to enable the source storage system and the destination storage system to have a common base data therein.

The source storage system and the destination storage system have different storage operating systems associated therewith. The method also includes negotiating between the source storage system and the destination storage system for the common base data therein and obtaining, at the destination storage system, a difference between the common base data and a point-in-time image of the file system of the source storage system backed up at the destination storage system to configure a quota tree data, a volume data or a sub-directory data associated with the point-in-time image of the file system of the source storage system backed up at the destination storage system to be in a same state as a corresponding quota tree data, a volume data or a sub-directory data corresponding to the common base data at the destination storage system.

The point-in-time image of the file system of the source storage system backed up at the destination storage system is configured to be in an immediate temporal past relative to a back up of data to be restored to the source storage system at the destination storage system and in a temporal past relative to the common base data at the destination storage system. Further, the method includes traversing an appropriate quota tree, a volume or a sub-directory corresponding to the quota tree data, the volume data or the sub-directory data associated with the point-in-time image of the file system of the source storage system backed up at the destination storage system starting from a root inode thereof in a tree order and fetching an inode associated with the common base data at the destination storage system corresponding to an inode associated with the point-in-time image of the file system of the source storage system backed up at the destination storage system based on an inode identifier thereof.

Still further, the method includes obtaining a difference between data associated with the two inodes as a difference between the common base data at the destination storage system and the point-in-time image of the file system of the source storage system backed up at the destination storage system, and applying, to the common base data at the source storage system, the differential change corresponding to the difference between the common base data at the destination storage system and the point-in-time image of the file system of the source storage system backed up at the destination storage system.

In yet another aspect, a storage environment configured to enable an incremental data restore includes a source storage system and a destination storage system configured to back up data associated with the source storage system. The source storage system and the destination storage system have different storage operating systems associated therewith. The destination storage system includes a processor and a memory. The memory includes storage locations configured to be addressable by the processor and the memory is configured to store instructions associated with a backup engine associated with the source storage system and the destination storage system.

The backup engine is configured to enable quiescing a file system associated with the source storage system, capturing, at the source storage system, a point-in-time image of the file system associated therewith, and sharing the captured point-in-time image of the file system associated with the source storage system with the destination storage system to enable the source storage system and the destination storage system to have a common base data therein. The backup engine is also configured to enable negotiating between the source storage system and the destination storage system for the common base data therein and applying, to the common base data at the source storage system, a differential change corresponding to a difference between the common base data at the destination storage system and a point-in-time image of the file system of the source storage system backed up at the destination storage system.

The point-in-time image of the file system of the source storage system backed up at the destination storage system is configured to be in an immediate temporal past relative to a back up of the data to be restored to the source storage system at the destination storage system and in a temporal past relative to the common base data at the destination storage system.

In a further aspect, a method of restoring data between storage systems having different storage operating systems associated therewith based on a commonality of point-in-time images is disclosed. The method includes generating a point-in-time image of a file system at a source storage system having a first storage operating system associated therewith. The source storage system is configured to have data associated therewith backed up at a destination storage system having a second storage operating system associated therewith. The first storage operating system is configured to implement the file system at the source storage system.

The method also includes providing, through a computer network, the point-in-time image to the destination storage system. The second storage operating system is configured to implement a file system different from that implemented through the first storage operating system. Further, the method includes establishing a common base data between the source storage system and the destination storage system through sharing the point-in-time image with the destination storage system, and incrementally restoring data associated with the source storage system through the destination storage system based on the common base data. The common base data is referenced by both the source storage system and the destination storage system based on an identification data.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to perform an incremental restore of data between storage systems having dissimilar storage operating systems associated therewith. Although the present embodiments have been described with reference to specific example embodiments, it will be evident that various modifications and changes may be made to these embodiments without departing from the broader spirit and scope of the various embodiments.

Figure 1:
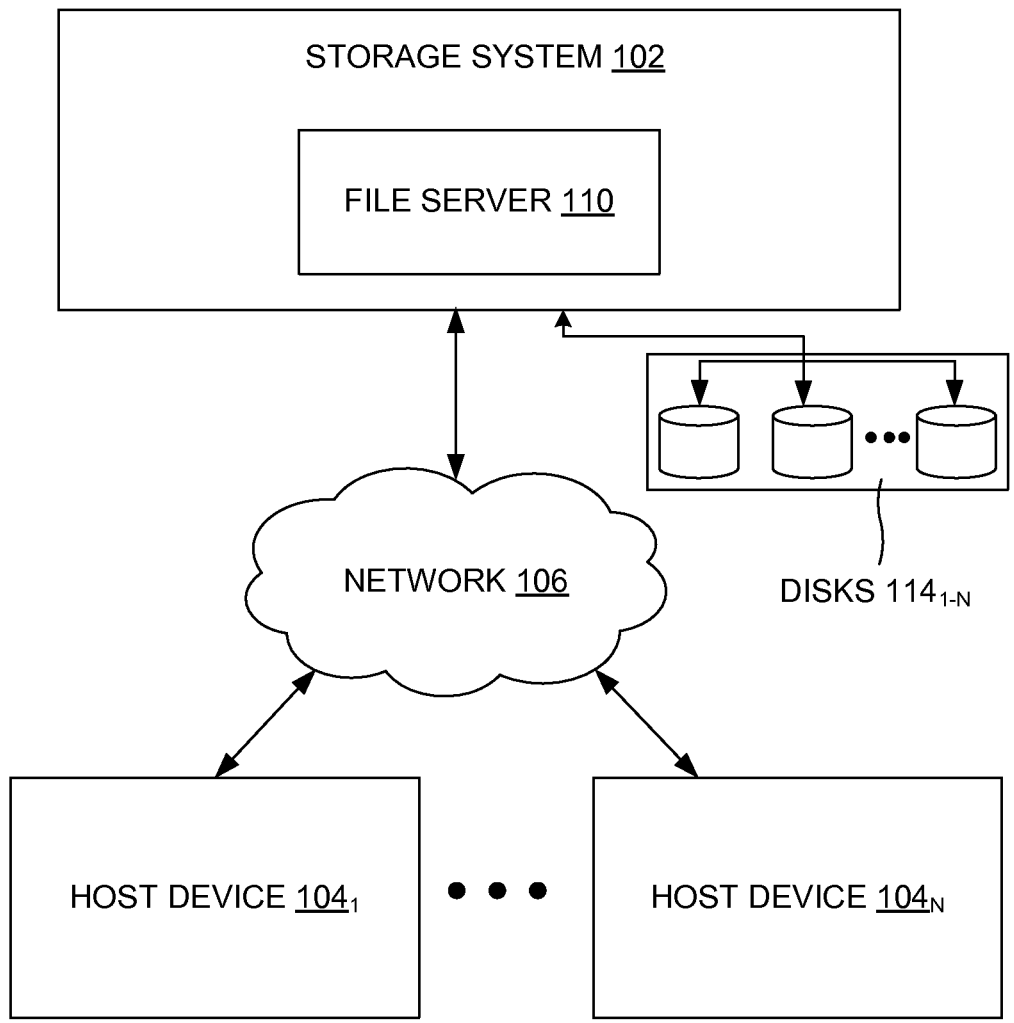
FIG. 1 is a schematic view of a storage system interfaced with a number of host devices through a network, according to one or more embodiments.

FIG. 1 shows a storage system 102 interfaced with a number of host devices 104$_{1-N}$ through a network 106, according to one or more embodiments. In one or more embodiments, host devices 104$_{1-N}$ may be general-purpose computing devices configured to execute applications (e.g., database applications). In one or more embodiments, network 106 may be a storage area network (SAN), a local area network (LAN), a wide area network (WAN), a virtual private network (VPN) using communication links over, for example, the Internet, or any combination thereof. In one or more embodiments, storage system 102 may directly communicate with host devices 104$_{1-N}$ as a Network Attached Storage (NAS) device or a Direct Attached Storage (DAS) device. In one or more embodiments, storage system 102 may operate in a hybrid SAN-NAS environment. For example, storage system 102 may offer file-serving capabilities, and may also serve data blocks over a Fiber Channel SAN.

In one or more embodiments, host devices 104$_{1-N}$ may indicate customers of services provided through network 106 or users/departments associated with an organization (e.g., an Information Technology (IT) organization). In one or more embodiments, each host device 104$_{1-N}$ may have storage associated therewith. For the aforementioned purpose, in one or more embodiments, isolated logical virtual storage partitions (not shown) may be created on storage system 102 through an operating system associated therewith. In one or more embodiments, therefore, each virtual storage partition may be associated with a host device 104$_{1-N}$. In one or more embodiments, information on a secured virtual storage partition may solely be accessed by the host device associated therewith.

In one or more embodiments, storage system 102 may include a storage server (e.g., file server 110) and may be associated with a set of mass storage devices (e.g., disks 114$_{1-N}$). In one or more embodiments, file server 110 may be configured to receive read/write requests from host devices 104$_{1-N}$ and to respond appropriately. In one or more embodiments, the requests may be directed to data stored in/to be stored in disks 114$_{1-N}$. Disks 114$_{1-N}$ may be, for example, conventional magnetic disks, optical disks such as compact disks-read only memory (CD-ROM) or digital versatile/video disks (DVD) based storage, magneto-optical (MO) storage, or any other type of non-volatile storage devices suitable for storing large quantities of data. In one or more embodiments, file server 110 may be construed as the "manager" of storage system 102. In one or more embodiments, a main purpose of file server 110 may be to provide a location or location(s) for shared disk access (e.g., shared storage of computer data) configured to be accessed by host devices 104$_{1-N}$.

In one or more embodiments, the operating system associated with storage system 102 may support data sets associated with protocols including but not limited to Network File System (NFS) protocol, Common Internet File System (CIFS) protocol, Internet Small Computer System Interface (iSCSI) protocol, Hypertext Transfer (HTTP) protocol, File Transfer Protocol (FTP), FTP-Secure (FTPS) protocol, Secure File Transfer Protocol (SFTP), and Network Data Management Protocol (NDMP).

Figure 2:
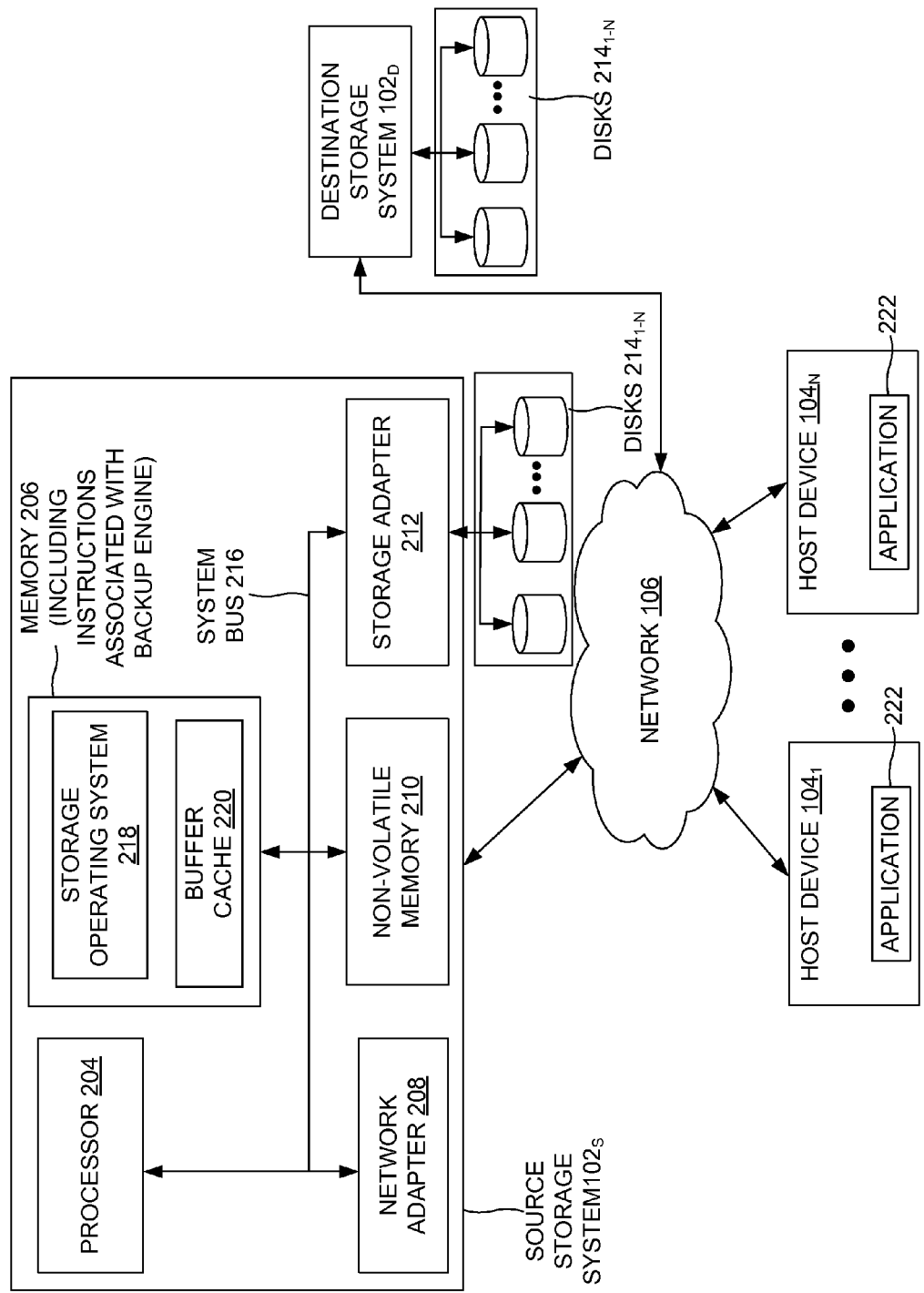
FIG. 2 is an expanded view of communication between a source storage system and a destination storage system, according to one or more embodiments.

FIG. 2 shows an expanded view of communication between two storage systems, viz., source storage system 102$_S$ and destination storage system 102$_D$, according to one or more embodiments. As the source storage system 102$_S$ and destination storage system 102$_D$ are analogous to one another, the same label (specifically, 102) may apply thereto.

In one or more embodiments, each of source storage system 102$_S$ and destination storage system 102$_D$ may be a computing device configured to organize information on disks 214$_{1-N}$ (analogous to disks 114$_{1-N}$). In one or more embodiments, each storage system (102$_S$, 102$_D$) may include a processor 204, a memory 206, a network adapter 208, a non-volatile memory 210 and a storage adapter 212 configured to be interconnected through a system bus 216. Here, the constituents of destination storage system 102$_D$ have been left out for clarity sake because destination storage system 102$_D$, as discussed above, is analogous to source storage system 102$_S$.

In one or more embodiments, each storage system (102$_S$, 102$_D$) may include storage operating system 218 configured to implement a file system as a hierarchical structure of files, directories and blocks on disks 214$_{1-N}$. In one or more embodiments, memory 206 may include a buffer cache 220 (e.g., volatile memory) configured to store data structures passed between disks 214$_{1-N}$ and network 106 during operation. In one or more embodiments, memory 206 may also be configured to store software code (e.g., instructions associated with a backup engine (to be discussed below)), and may include storage locations configured to be addressable by processor 204. In one or more embodiments, processor 204 and the adapters may include processing elements and/or logic circuitry configured to execute instructions in memory 206 and to manipulate the data structures. In one or more embodiments, each storage system (102$_S$, 102$_D$) may also include non-volatile memory 210 (e.g., Non-Volatile Random Access Memory (NVRAM)) configured to provide fault-tolerant back-up of data to enable survival of storage system (102$_S$, 102$_D$) during power failure and/or other faults.

In one or more embodiments, network adapter 208 may be configured to couple storage system (102$_S$, 102$_D$) to host devices 104$_{1-N}$ through network 106. In one or more embodiments, storage adapter 210 may be configured to communicate with storage operating system 218 to access information requested through host devices 104$_{1-N}$. In one or more embodiments, host devices 104$_{1-N}$ may be configured to execute applications 222. In one or more embodiments, a host device 104$_{1-N}$ may be configured to interact with storage system (102$_S$, 102$_D$) according to a client/server model of information delivery. For example, host device 104$_{1-N}$ may request the services of storage system (102$_S$, 102$_D$), and storage system (102$_S$, 102$_D$) may return the results (e.g., through packets) through network 106.

In one or more embodiments, storage of information may be implemented as volumes (not shown), and may include configuring disks 214$_{1-N}$ to implement a logical arrangement of volume block number (VBN) space on the volumes. In one or more embodiments, each logical volume may be associated with the file system, as discussed above. In one or more embodiments, the file system may include a continuous range of VBNs starting from 0 to n, for a file system of (n−1) blocks. In one or more embodiments, disks 214$_{1-N}$ within a volume may be organized as one or more Redundant Array of Independent Disks (RAID) groups. In one or more embodiments, to facilitate access to disks 214$_{1-N}$, storage operating system 218 may implement a "write-anywhere" file system (e.g., NetApp®'s WAFL™ file system) to map the storage space provided by disks 214$_{1-N}$ to host devices 104$_{1-N}$.

In one or more embodiments, source storage system 102$_S$ and destination storage system 102$_D$ may both include file servers (110$_S$, 110$_D$) implemented through a same type of storage operating system 218 (e.g., NetApp®'s Data ONTAP® operating system). In one or more embodiments, source storage system 102$_S$ and destination storage system 102$_D$ may also have different operating systems associated therewith. For example, storage operating system 218 of destination storage system 102$_D$ may be NetApp®'s Data ONTAP® operating system and the operating system associated with source storage system 102$_S$ may be Microsoft®'s Windows®, UNIX, Linux or VMWare®'s ESX®. In one or more embodiments, here, the operating system associated with source storage system 102$_S$ may implement a file system that is different from a file system implemented through the operating system associated with destination storage system 102$_D$.

Figure 3:
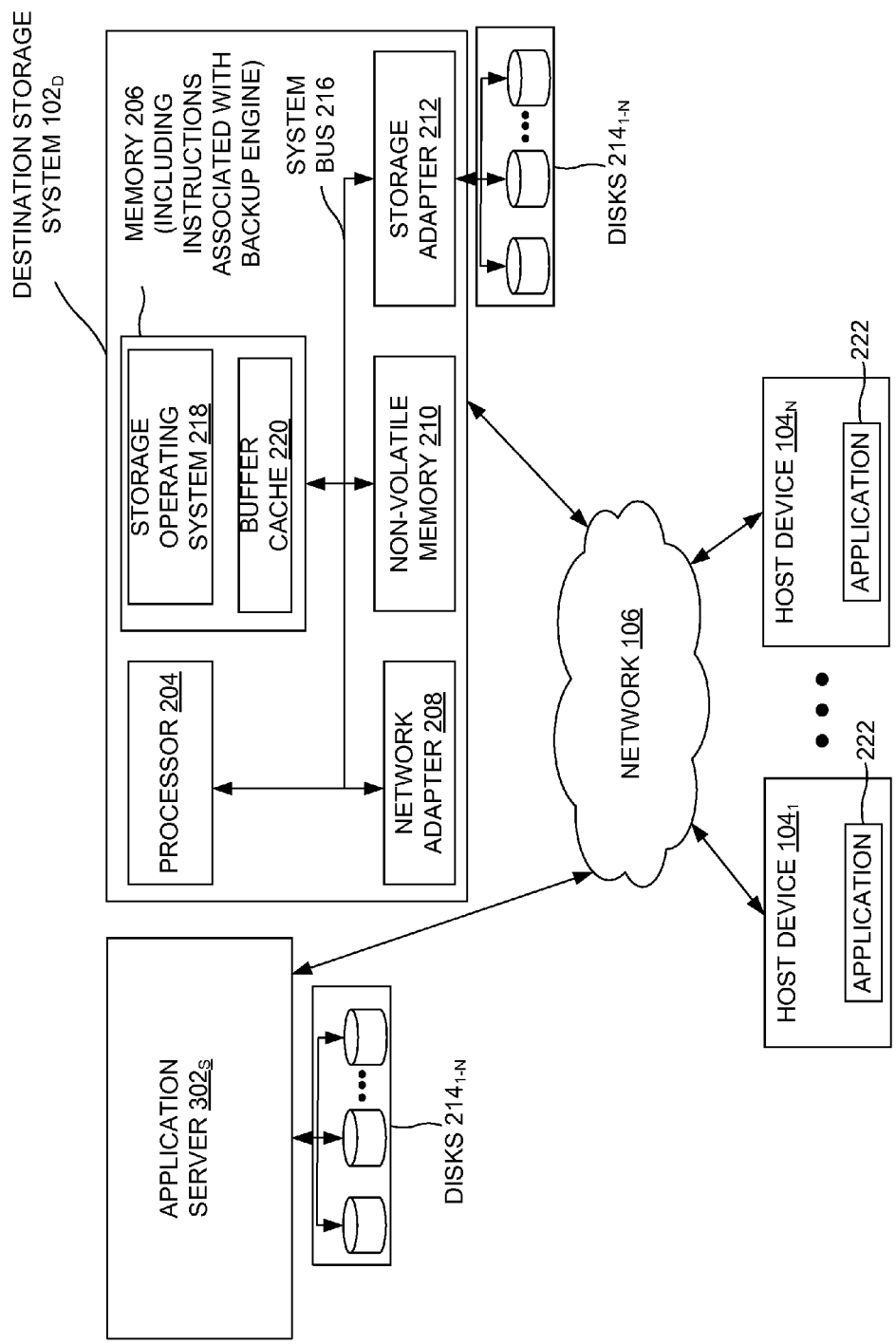
FIG. 3 is an expanded view of communication between a third-party source storage system and a destination storage system, according to one or more embodiments.

In one or more embodiments, storage on destination storage system 102$_D$ associated with storage operating system 218 may be sold to a customer for back-up purposes (e.g., a customer at source storage system 102$_S$). Thus, in the case of source storage system 102$_S$ being associated with an operating system different from that of destination storage system 102$_D$, source storage system 102$_S$ may be the third-party client. FIG. 3 shows an expanded view of communication between the third-party source storage system 102$_S$ (here, as application server 302$_S$) and destination storage system 102$_D$, according to one or more embodiments. It is to be noted that elements of application server 102$_S$ and, obviously, the operating system associated therewith are different from the corresponding elements of destination storage system 102$_D$ and the operating system associated with destination storage system 102$_D$.

In one or more embodiments, data on source storage system 102$_S$ (or, the third-party client) may be backed up through the utilization of an open system backup engine (e.g., NetApp®'s Open Systems SnapVault® (OSSV®)). In one or more embodiments, data on the third-party source storage system 102$_S$ may reside on locally attached disk(s) or SAN attached disks and may include a disk, a file system or a sub-directory. In one or more embodiments, the open system backup engine may be configured to enable the sole backup of blocks of data that have changed since the previous backup. In one or more embodiments, a full backup may be performed only during the first backup.

In one or more embodiments, the full backup may involve invoking a baseline transfer through destination storage system 102$_D$ contacting the third-party source storage system 102$_S$ to request a baseline transfer of the requisite data on source storage system 102$_S$. In one or more embodiments, the baseline transfer may be invoked through the creation of an open system backup engine relationship between source storage system 102$_S$ and destination storage system 102$_D$. In one or more embodiments, the aforementioned relationship may be created at destination storage system 102$_D$ through issuing one or more command(s) associated with the open system backup engine at source storage system 102$_S$. In one or more embodiments, an agent associated with the open system backup engine may be installed on source storage system 102$_S$ requiring backup.

In one or more embodiments, after the baseline transfer is complete, the open system backup engine may be configured to perform block-level incremental transfers through calculating checksums for every incremental block-size (e.g., 4 kB) of data from source storage system 102$_S$. In one or more embodiments, information associated with the checksums may be stored in a database associated with source storage system 102$_S$. In one or more embodiments, the data on source storage system 102$_S$ may then be transferred to a quota tree (qtree) associated with a volume on destination storage system 102$_D$. In one or more embodiments, following the completion of the baseline transfer, a snapshot copy (e.g., a read-only, point-in-time image of the file system associated with source storage system 102$_S$) may be taken at destination storage system 102$_D$.

In one or more embodiments, backups performed after the initial baseline transfer through the open system backup engine may be block-level incremental in nature. In one or more embodiments, through the incremental block-size checksums calculated, as discussed above, the open system backup engine may be configured to enable the sole backup (s) of blocks within the files of source storage system 102$_S$ that have changed. Thus, in one or more embodiments, backups through the open system backup engine may be suited to a slow network 106, may be faster and/or may result in bandwidth savings associated with network 106.

In one or more embodiments, information about file deletions in the third-party source storage system 102$_S$ may be communicated to destination storage system 102$_D$. In one or more embodiments, checksum calculations may then be performed on the modified files, following which the backup data may be transferred to destination storage system 102$_D$.

In one or more embodiments, as discussed above, backups of data of the third-party source storage system 102$_S$ may map to a qtree within a volume of destination storage system 102$_D$. In one or more embodiments, a number of open system backup engine relationships may share the same volume of destination storage system 102$_D$. However, in one or more embodiments, each relationship may have a unique qtree associated therewith. In one or more embodiments, data of source storage system 102$_S$ may also be a member of multiple open system backup engine relationships.

In one or more embodiments, backups may be captured in destination storage system 102$_D$ as snapshot copies, as discussed above. In one or more embodiments, the retention of the aforementioned copies may depend on the level of retention (e.g., a number of hourly backups, a number of daily backups, a number of weekly backups, a number of monthly backups). In one or more embodiments, during recovery from destination storage system 102$_D$, the data backed up may be restored directly from the corresponding copy.

In one or more embodiments, the contents of the snapshot copies may represent a full data backup and may be completely accessible/readable because of the open system backup engine being configured to store backups in a native format.

In one or more embodiments, data (e.g., applications) of the third-party source storage system 102$_S$ may be backed up at destination storage system 102$_D$ such that the data granularity at the backup on the file system associated with destination storage system 102$_D$ may not be a one-on-one mapping of the data granularity of source storage system 102$_S$. For example, virtual machines (VMs) of source storage system 102$_S$ may be backed up at destination storage system 102$_D$. Eventually, Virtual Machine Disks (VMDK) and vmdk files associated therewith may also be backed up at destination storage system 102$_D$. In an instance of a particular folder including data (e.g., files) or a particular file being erroneously deleted from the operating system executing on the VMDKs associated with source storage system 102$_S$, the aforementioned erroneously deleted folder/file may need to be restored at source storage system 102$_S$. Due to the above-mentioned difference in data granularity of source data between source storage system 102$_S$ and destination storage system 102$_D$, the VMDKs associated with source storage system 102$_S$ may be seen as, for example, individual files at destination storage system 102$_D$.

Thus, in one or more embodiments, even to restore an erroneously deleted file, restoring a full-backup of the VMDK may need to done. In one or more embodiments, even restoring associated with the smallest available full storage container (e.g., sub-directory) including the erroneously deleted file may prove to be time-consuming, network 106 bandwidth wasting and/or inefficient.

In one or more embodiments, as discussed above, source storage system $102_S$ and destination storage system $102_D$ may execute the same operating systems (e.g., storage operating system 218) therein. Here, the data granularity of the source data at destination storage system $102_D$ may be the same as that at source storage system $102_S$. For example, in order to restore an erroneously deleted folder on source storage system $102_S$ (note: here, source storage system $102_S$ is associated with the same operating system as destination storage system $102_D$, viz., storage operating system 218), the backup engine (not the open system backup engine; an example of the backup engine would be NetApp®'s SnapVault®) associated therewith may be configured to perform a differential update on a common-base data (e.g., snapshot) associated with both source storage system $102_S$ and destination storage system $102_D$ at source storage system $102_S$.

It is to be noted that source storage system $102_S$ is configured to be the "source" and destination storage system $102_D$ is configured to be the "destination" during the backup process and source storage system $102_S$ is configured to be the "destination" and destination storage system $102_D$ is configured to be the "source" during the restore process.

Figure 4:
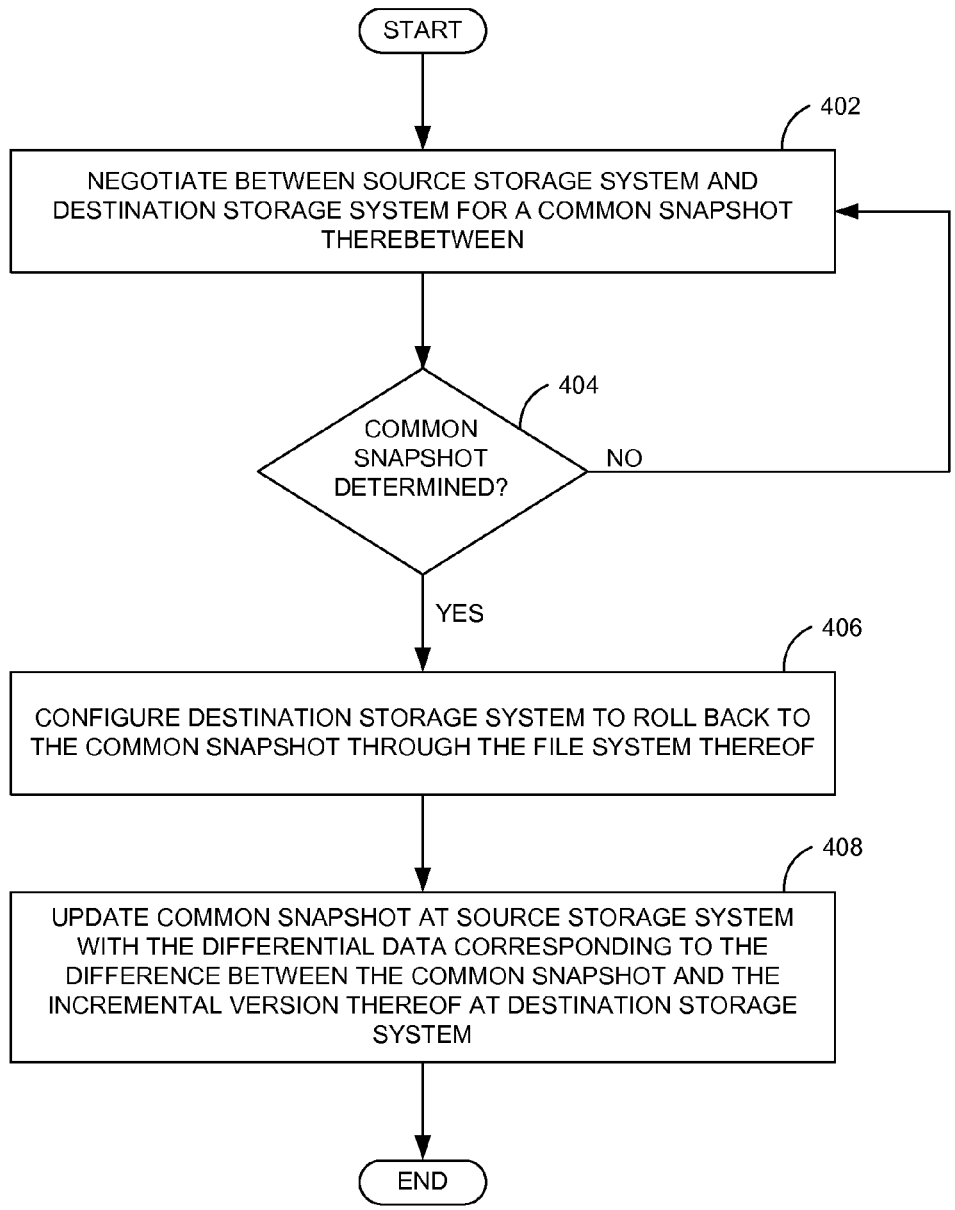
FIG. 4 is a flowchart detailing the operations involved in restoring data to a source storage system through an incremental restore process, according to one or more embodiments.

FIG. 4 shows a flowchart detailing the operations involved in restoring data to source storage system $102_S$ through an incremental restore process, according to one or more embodiments. Here, source storage system $102_S$ and destination storage system $102_D$ have same operating systems implemented therein (refer to FIG. 2). In one or more embodiments, operation 402 may involve negotiating between source storage system $102_S$ and destination storage system $102_D$ for a common snapshot therebetween. For example, the common snapshot may be a previous version of the file system at source storage system $102_S$ prior to the erroneous deletion of the folder that may also be backed up at destination storage system $102_D$. In one example embodiment, destination storage system $102_D$ may be configured to send a list of snapshots to source storage system $102_S$, and source storage system $102_S$ may be configured to select the backup of an immediately previous version of the file system prior to the erroneous deletion of the folder.

In one or more embodiments, operation 404 may involve checking as to whether the common snapshot between source storage system $102_S$ and destination storage system $102_D$ has been determined. If yes, in one or more embodiments, operation 406 may involve configuring destination storage system $102_D$ to roll back to the common snapshot through the file system thereof. In one or more embodiments, the rolling back of destination storage system $102_D$ may include performing a difference operation between the common snapshot and the incremental version thereof of destination storage system $102_D$ at destination storage system $102_D$ so as to configure the qtree data associated therewith to be in the same state as the qtree data corresponding to the common snapshot. For example, the incremental version of the common snapshot at destination storage system $102_D$ may be associated with the corresponding backup of the immediately previous version of the file system prior to the erroneous deletion of the folder of source storage system $102_S$ at destination storage system $102_D$.

In one or more embodiments, if the result of the checking in operation 404 indicates that the common snapshot has not been determined, control may be transferred to the negotiation in operation 402. In one or more embodiments, the negotiation may continue until the common snapshot is determined. Else, in one or more embodiments, a full restore process may be attempted.

In one or more embodiments, operation 408 may then involve updating the common snapshot (e.g., an immediate previous version of the file system prior to the erroneous deletion of the folder) at source storage system $102_S$ with the differential data corresponding to the difference between the common snapshot (e.g., the backup of the immediate previous version of the file system of source storage system $102_S$ prior to the erroneous deletion of the folder at destination storage system $102_S$) and the incremental version thereof at destination storage system $102_D$. For example, the common snapshot may be updated with the differential data to restore the erroneously deleted folder.

In one or more embodiments, the aforementioned restoring process may be initiated by source storage system $102_S$, which serves as the "destination" during the process. In one or more embodiments, when source storage system $102_S$ is a third-party system as in FIG. 3, source storage system $102_S$ may not be configured to operate on/with snapshots. In one or more embodiments, source storage system $102_S$ may not even be configured to retain snapshots. Thus, in one or more embodiments, it may not be possible to negotiate a common snapshot between source storage system $102_S$ and destination storage system $102_D$ using the open system backup engine as discussed above. Additionally, the difference in granularity of source data at source storage system $102_S$ and destination storage system $102_D$ may necessitate a full restore using the open system backup engine.

In one or more embodiments, utilizing an appropriate interface at source storage system $102_S$ may enable remote triggering of an update associated with the open system backup engine/backup engine through destination storage system $102_D$. Note that destination storage system $102_D$ is the "source" here. For example, an Application Programming Interface (API) at source storage system $102_S$ may be configured to invoke an update command associated with the open system backup engine/backup engine. In one or more embodiments, the update command may trigger an update from destination storage system $102_D$. Alternately, in one or more embodiments, the update associated with the open system backup engine/backup engine may directly be triggered from destination storage system $102_D$. It is for the advantageous purpose of remotely triggering the update that the API may be provided at source storage system $102_S$. An example of the API may be the Zephyr API (ZAPI), a proprietary API of Network Appliance, Inc.

In one or more embodiments, quiescing may be pausing and/or altering a state of processes executing on a computer, particularly those that may modify information stored on disk during a backup, in order to guarantee a consistent and usable backup. In one or more embodiments, following the triggering of the update from destination storage system $102_D$, the file system of source storage system $102_S$ may be quiesced and a point-in-time image of the file system may momentarily be captured. In one or more embodiments, the "quiescing" of the file system may imply that the file system of source storage system $102_S$ may be "frozen," i.e., no further updates thereto (e.g., no further Input/Output (I/O)) may occur. In an example embodiment, the quiescing of the file system of application server $302_S$ (example of source storage system $102_S$) of FIG. 3 may trigger a consistency point (CP) therein. In the example embodiment, the CP may constitute an operation during which the operating system of application server $302_S$ flushes "in-core" data (e.g., data in a buffer cache; all data not residing on disks $214_{1-N}$) changes associated with source storage system $102_S$ to corresponding locations on disk $214_{1-N}$.

In one or more embodiments, as part of the update command discussed above, the operating system of source storage system $102_S$ may then be configured to capture the point-in-time image of the file system associated therewith. Although the operating system of source storage system $102_S$ (e.g., application server $302_S$) may not be configured to support snapshots, the operating system may hold onto the point-in-time image during the quiescing of the file system. For example, the triggering of the update discussed above may involve the operating system of source storage system $102_S$ associating an identification (ID) data with the captured point-in-time image of the file system, analogous to a snapshot (snap) ID being used to tag snapshots in an operating system configured to support snapshots. For instance, the aforementioned identification data may be an integer, which may be utilized to track the point-in-time image.

Alternately, in one or more embodiments, a series of point-in-time images may be captured and the last point-in-time image that is captured immediately prior to the quiescing may be chosen as the "snapshot" to be common with destination storage system $102_D$, as seen below. In one or more embodiments, the point-in-time image of the file system at source storage system $102_S$ may momentarily be held on to following the quiescing of the file system of source storage system $102_S$. In one or more embodiments, in order for there being a common base data between source storage system $102_S$ and destination storage system $102_D$, the point-in-time image of the file system at source storage system $102_S$ may then be shared with destination storage system $102_D$. For the aforementioned purpose, for example, the point-in-time image of the file system at source storage system $102_S$ may be transmitted to destination storage system $102_D$ through network 106.

Thus, in one or more embodiments, both source storage system $102_S$ and destination storage system $102_D$ may now include a common "snapshot," as in the case where source storage system $102_S$ and destination storage system $102_D$ have the same operating systems (e.g., storage operating system 218) associated therewith. In one or more embodiments, destination storage system $102_D$ may have the appropriate license(s) by way of the open system backup engine (e.g., NetApp®'s OSSV®) to receive data from the third-party source storage system $102_S$. In one or more embodiments, the negotiation process between source storage system $102_S$ and destination storage system $102_D$ for the common snapshot therebetween may yield the abovementioned point-in-time image as the common "snapshot."

In one or more embodiments, a negotiation process may be a dialogue of information exchanges between source storage system $102_S$ and destination storage system $102_D$ intended to resolve disputes and to produce an agreement for a course of action with respect to a point-in-time image. In one or more embodiments, the negotiation process may involve the open system backup engine searching in source storage system $102_S$ and destination storage system $102_D$ for the common "snapshot." In one or more embodiments, as the operating system of destination storage system $102_D$ may be configured to tag an appropriate identification data to the point-in-time image of the file system of source storage system $102_S$ shared therefrom and source storage system $102_S$ may include just the aforementioned point-in-time image, the negotiation process may result in the quick selection of the common "snapshot." In one or more embodiments, the negotiation process may occur through network 106.

In one example embodiment, destination storage system $102_D$ may be configured to send a list of snapshots to source storage system $102_S$, and source storage system $102_S$ may be configured to select the shared point-in-time image as the common "snapshot."

In one or more embodiments, source storage system $102_S$ may be configured to copy the data associated with the file system at another location therein after the quiescing thereof for redundancy purposes. In case the quiescing fails and/or updates to the file system of source storage system $102_S$ occur, source storage system $102_S$ may have the backup of the "original" data. It is to be noted that here, in one or more embodiments, as destination storage system $102_D$ includes the shared point-in-time image, destination storage system $102_D$ may not be required to roll back to the common "snapshot" as in FIG. 4.

In one or more embodiments, source storage system $102_S$ may then be configured to request for an "incremental restore" from an appropriate "back-in-time" version (or, snapshot) of the backed-up data (e.g., a destination storage system $102_D$ backup of the file system of source storage system $102_S$ immediately prior to the erroneous deletion of the folder) through destination storage system $102_D$. In one or more embodiments, the "back-in-time" snapshot may be the snapshot to which source storage system $102_S$ requires the restored data to be synchronized to.

It is obvious that the appropriate backed-up data is always in a temporal past (or, "back-in-time") relative to the common "snapshot" because the common "snapshot" is captured after the back-up of, for example, the immediate previous version of the file system of source storage system $102_S$ prior to the erroneous deletion of the folder at destination storage system $102_D$. Again, in one or more embodiments, a difference operation between the common "snapshot" and the "back-in-time" snapshot at destination storage system $102_D$ may be performed so as to configure the qtree data associated therewith to be in the same state as the qtree data corresponding to the common "snapshot."

In one or more embodiments, the differential data changes between the corresponding common "snapshot" and the "back-in-time" snapshot may be obtained at destination storage system $102_D$. In one or more embodiments, the common "snapshot" at source storage system $102_S$ may then be updated with the differential data corresponding to the difference between the common snapshot and the incremental version thereof at destination storage system $102_D$. For example, the common "snapshot" may be updated with the differential data to restore the erroneously deleted folder at source storage system $102_S$. For the aforementioned restoring purpose, in one or more embodiments, the differential data may be transmitted (e.g., through network 106) from destination storage system $102_D$ to source storage system $102_S$.

Figure 5:
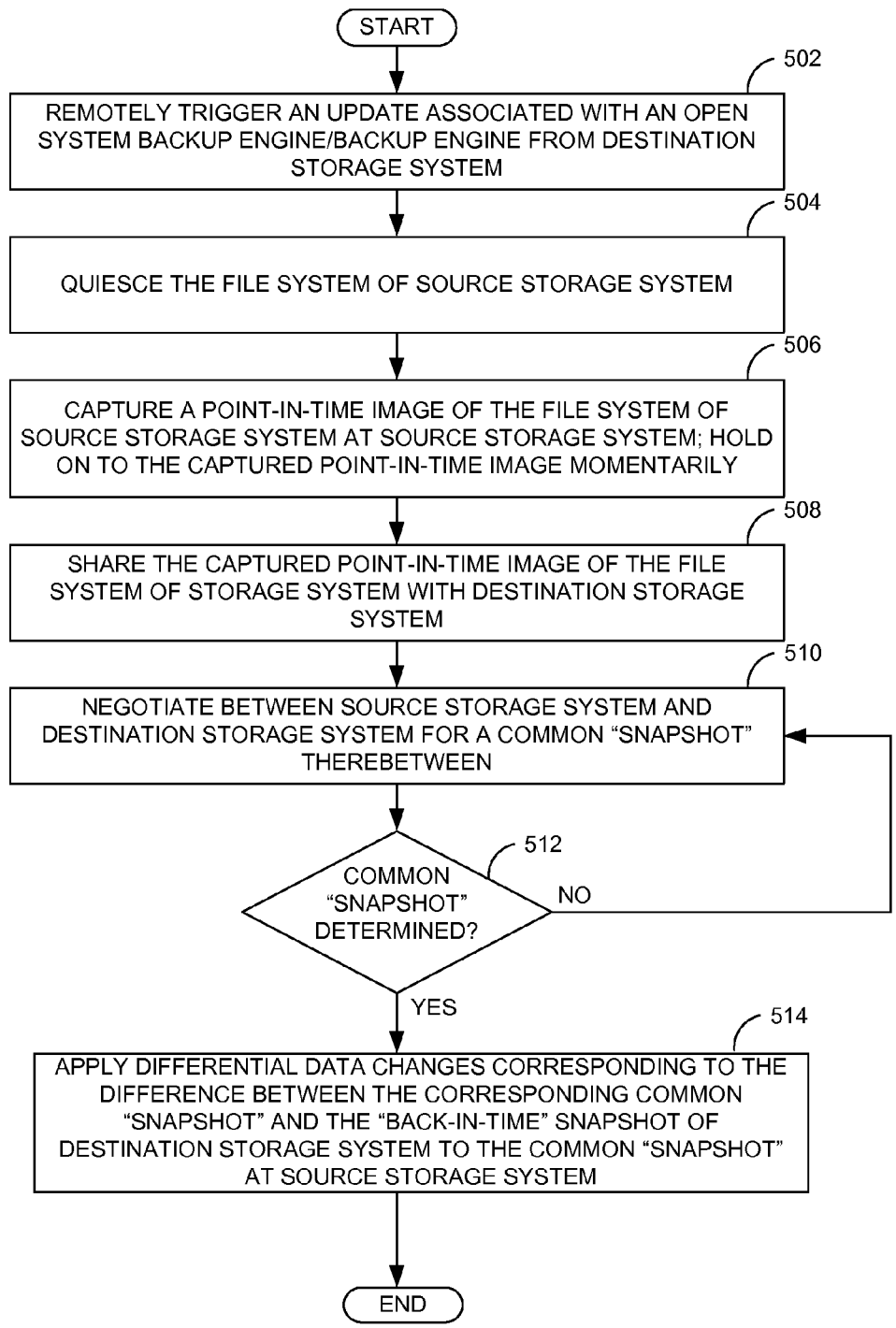
FIG. 5 is a flowchart detailing the operations involved in incrementally restoring data at a source storage system configured to have an operating system different from that of a destination storage system, according to one or more embodiments.

FIG. 5 shows a flowchart summarizing the abovementioned operations, according to one or more embodiments. Specifically, FIG. 5 shows a flowchart detailing the operations involved in incrementally restoring data at source storage system $102_S$ configured to have an operating system different from that of destination storage system $102_D$, according to one or more embodiments. In one or more embodiments, operation 502 may involve remotely triggering an update associated with the open system backup engine/backup engine from destination storage system $102_D$ through utilizing an appropriate interface at source storage system $102_S$. In one or more embodiments, operation 504 may then involve quiescing the file system of source storage system $102_S$.

According to one or more embodiments, capturing a point-in-time image of the file system associated with the source storage system may mean the storage operating system associated with the source storage system generating a point-in-time image of the file system and associating a new identification data with the point-in-time image. In one or more embodiments, operation 506 may then involve capturing a point-in-time image of the file system associated with source storage system $102_S$ at source storage system $102_S$ and holding on to the captured point-in-time image momentarily in memory.

In one or more embodiments, sharing the point-in-time image of the file system associated with the source storage system (e.g., source storage system $102_S$) may mean forwarding the point-in-time image to the destination storage system (e.g., destination storage system $102_D$), whereby the destination storage system manages the received point-in-time image based on a "snapshot" identification data (e.g., snap ID) tagged onto the point-in-time image by the storage operating system associated therewith. In one or more embodiments, operation 508 may then involve sharing (e.g., through network 106) the captured point-in-time image of the file system associated with source storage system $102_S$ with destination storage system $102_D$ (e.g., through the reference identification data initially generated by the source storage system) to enable source storage system $102_S$ and destination storage system $102_D$ to have a common "snapshot" therebetween.

In one or more embodiments, operation 510 may then involve negotiating between source storage system $102_S$ and destination storage system $102_D$ for the common snapshot therebetween. For instance, the negotiation process may involve destination storage system $102_D$ forwarding a list of snapshots therein to source storage system $102_S$. Upon the receipt of the snapshots, source storage system $102_S$ may be configured to compare the list of snapshots with the point-in-time image therein based on the identification data. In an example embodiment, destination storage system $102_D$ may further associate a common base data identifier with the common "snapshot" at source storage system $102_S$ and destination storage system $102_D$.

In one or more embodiments, operation 512 may then involve checking as to whether the common "snapshot" between source storage system $102_S$ and destination storage system $102_D$ has been determined. In an example embodiment, determining the common "snapshot" may involve destination storage system $102_D$ transmitting a message to source storage system $102_S$, wherein the message includes the identification data of the common "snapshot" as determined by destination storage system $102_D$. Upon receipt, source storage system $102_S$ may be configured to select the common "snapshot" based on the identification data tagged therethrough and the identification data from destination storage system $102_D$.

In one or more embodiments, if the common "snapshot" is determined, a difference operation between the common "snapshot" and an appropriate "back-in-time" snapshot may be performed at destination storage system $102_D$ so as to configure the qtree data associated therewith to be in the same state as the qtree data corresponding to the common "snapshot." In one or more embodiments, source storage system $102_S$ may then be configured to request for the "incremental restore" from the appropriate "back-in-time" version (or, snapshot) of the backed-up data (e.g., back-up of an immediate previous version of the file system at source storage system $102_D$ prior to the deletion of the folder) through destination storage system $102_D$. In one or more embodiments, the "back-in-time" snapshot may be the snapshot to which source storage system $102_S$ requires the restored data to be synchronized to.

In one or more embodiments, if No, control may be transferred to operation 510 so that the negotiation process may be continued. In one example embodiment, if the negotiation is still unsuccessful, the full restore process may be performed.

In one or more embodiments, applying a differential data may mean appending a differential data to the common "snapshot" at the source storage system (e.g., source storage system $102_S$) and/or the destination storage system (e.g., destination storage system $102_D$). Thus, in one or more embodiments, operation 514 may involve applying the differential data changes corresponding to the difference between the corresponding common "snapshot" and the "back-in-time" snapshot of destination storage system $102_D$ to the common "snapshot" at source storage system $102_S$. For example, the common "snapshot" may be updated with the differential data to restore the erroneously deleted folder (or, sub-directory) at source storage system $102_S$.

Tree structures of file systems, inodes, inode files, volumes, sub-directories and qtrees are known to one skilled in the art. It is obvious that qtree data associated with the snapshots has been discussed above because of destination storage system $102_D$ being configured to back up data in qtrees. In one or more embodiments, destination storage system $102_D$ may also be configured to back data up in volumes and other sub-directories. The aforementioned modifications are within the scope of the exemplary embodiments. Further, it is obvious that the open system backup engine is merely used for illustrative clarity with regard to FIG. 5, and that a mere "backup engine" will suffice. Although, a qtrees is special sub-directory of the root directory of a volume, a qtree may be considered distinct from other sub-directories for illustrative convenience.

In one or more embodiments, snapshots may include an ordered list of inodes associated therewith, In one or more embodiments, when source storage system $102_S$ and destination storage system $102_D$ are implemented with the same operating system (e.g., storage operating system 218), the differential data processing between the common snapshot (refer to FIG. 4) and the incremental version thereof at destination storage system $102_D$ may involve scanning through the inode files associated with the ordered list of inodes of both the snapshots. In one or more embodiments, inodes of interest may be chosen and the remaining inodes filtered out. In one or more embodiments, the difference between the corresponding each filtered-out inode of both the snapshots may then be obtained.

In one or more embodiments, the abovementioned scanning process may not guarantee order in processing inodes from the perspective of a parent-child relationship between directories/files. For example, the child sub-directory may be processed prior to the parent directory. In one or more embodiments, utilizing the same approach in the case of source storage system $102_S$ being a third-party application server implemented with an operating system different from that of destination storage system $102_D$ may force the third-party source storage system $102_S$ to mimic the unordered processing, which may lead to complexities involved therein.

Therefore, in one or more embodiments, in the case of performing an incremental restore to a third-party source storage system $102_S$, the scanning process may being with the root inode of a subtree/directory and may be followed by processing of all the children thereof until the bottom of the tree is reached. Here, in one or more embodiments, in order to perform the incremental restore to the third-party source storage system $102_D$ (refer to FIG. 5), a qtree in the "back-in-time" snapshot at destination storage system $102_D$ may be traversed starting from the root inode thereof. In one or more embodiments, for each inode number (or, inode identifier) associated with an inode of the "back-in-time" snapshot, a corresponding inode (i.e., corresponding to the same inode number) of the common "snapshot" at destination storage system $102_D$ may be fetched. In one or more embodiments, the differential data (e.g., newly-created/modified files and/or directories) between the two inodes may then be obtained through the processing.

In one or more embodiments, the differential data may include attributes that are incompatible with the operating system (e.g., storage operating system 218) at destination storage system $102_D$ and, therefore, may be sent as is to the third-party source storage system $102_S$. For example, if the third-party source storage system $102_S$ is Microsoft®'s Windows® based, meta files associated therewith may be incompatible with destination storage system $102_D$ implemented with NetApp®'s Data ONTAP operating system. Although there may be a one-on-one correspondence for the meta files at destination storage system $102_D$, the operating system at destination storage system $102_D$ may not be able to interpret the files.

It is obvious that when incremental restore is associated with a single file, the scanning process beginning with the root inode of a subtree/directory may not be required. The single file may merely be tracked and then restored through the "incremental restore" process.

Thus, in one or more embodiments, performing the incremental restore to the third-party source storage system $102_S$ using the scanning order discussed above and the process described in FIG. 5 may not require any special design of the third-party source storage system $102_S$. In one or more embodiments, if the third-party source storage system $102_S$ and destination storage system $102_D$ include data that are almost similar, except for a small difference, the incremental restore process discussed above may consume a mere fraction of the time required to perform a full baseline restore. In one or more embodiments, due to the lesser amount of data required to be stored at the third-party source storage system $102_S$, there may be space savings associated with the incremental restore process.

In one or more embodiments, as a lot of third-party source storage systems $102_S$ are deployed in WAN environments, network bandwidth may be saved due to the incremental restore process. In one or more embodiments, the incremental restore process discussed above may enable efficient application restores. In one or more embodiments, applications may use incremental restore with finer data granularity instead of resorting to the full back-up restore.

In one or more embodiments, an alternate approach to performing sub-file level restores may include implementing a selective block restore process. In one or more embodiments, here, destination storage system $102_D$ may solely restore the blocks of data as requested/required by source storage system $102_S$. In one or more embodiments, source storage system $102_S$ may be configured to track changes of data (e.g., files) therein and request for specific blocks associated with the data as and when required as part of the restore process.

For example, source storage system $102_S$ may create a list of {inode number, range/set of file block numbers (FBNs)} and transmit the list to destination storage system $102_D$. In one or more embodiments, destination storage system $102_D$ may then transmit the requested blocks for the corresponding data (e.g., files), along with the extended attributes associated therewith. In one or more embodiments, the abovementioned approach may require a redirecting mechanism (e.g., a filter driver) associated with the one or more platforms that source storage system $102_S$ is configured to support.

Figure 6:
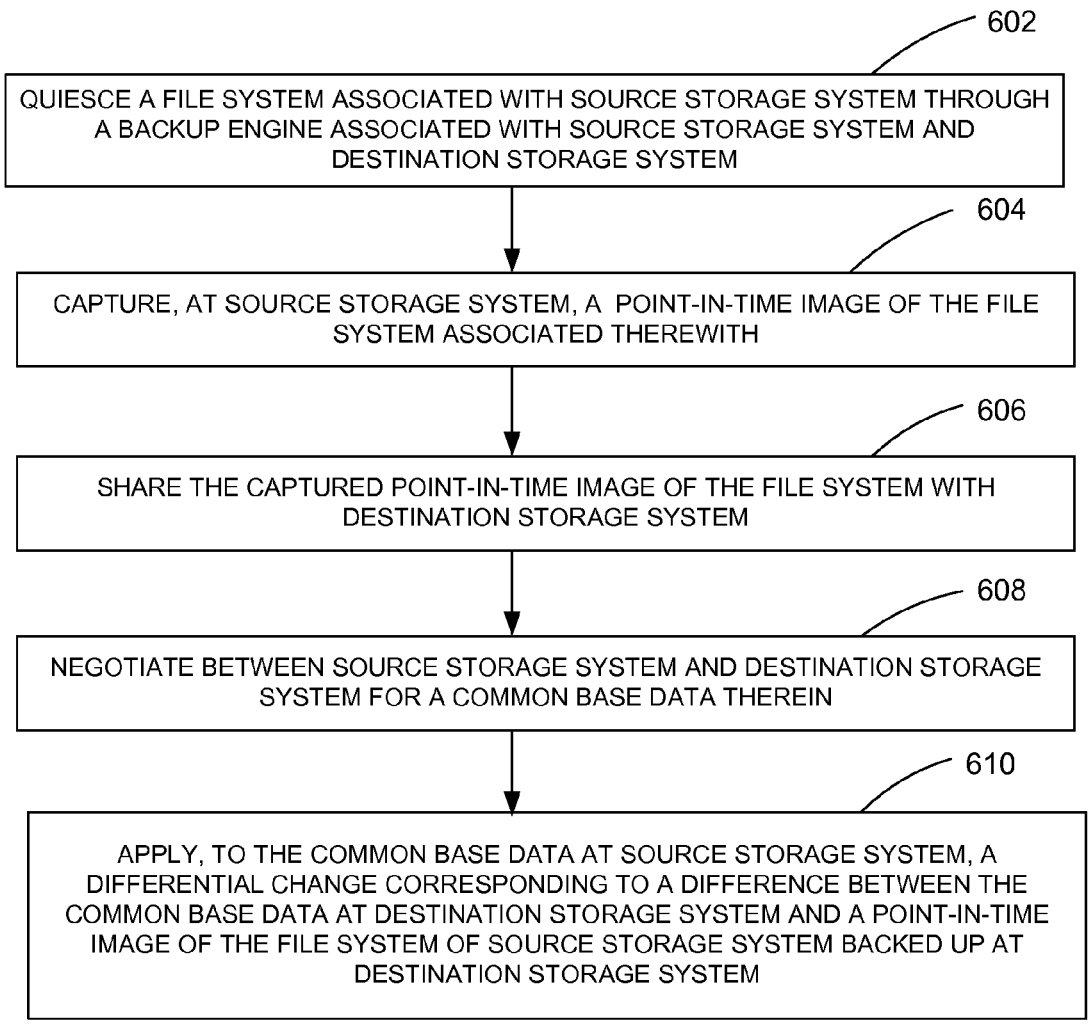
FIG. 6 is a process flow diagram detailing the operations involved in a method of restoring data associated with a source storage system configured to be backed up at a destination storage system to the source storage system, according to one or more embodiments.

FIG. 6 shows a process flow diagram detailing the operations involved in a method of restoring data associated with source storage system $102_S$ configured to be backed up at destination storage system $102_D$ to source storage system $102_S$, according to one or more embodiments. In one or more embodiments, operation 602 may involve quiescing a file system associated with source storage system $102_S$ through a backup engine associated with source storage system $102_S$ and destination storage system $102_D$. In one or more embodiments, source storage system $102_S$ and destination storage system $102_D$ may have different operating systems associated therewith.

In one or more embodiments, operation 604 may involve capturing, at source storage system $102_S$, a point-in-time image of the file system associated therewith through the backup engine. In one or more embodiments, operation 606 may involve sharing the captured point-in-time image of the file system associated with source storage system $102_S$ with destination storage system $102_D$ to enable source storage system $102_S$ and destination storage system $102_D$ to have a common base data therein. In one or more embodiments, operation 608 may involve negotiating between source storage system $102_S$ and destination storage system $102_D$ for the common base data therein.

In one or more embodiments, operation 610 may then involve applying, to the common base data at source storage system $102_S$, a differential change corresponding to a difference between the common base data at destination storage system $102_D$ and a point-in-time image of the file system of source storage system $102_S$ backed up at destination storage system $102_D$. In one or more embodiments, the point-in-time image of the file system of source storage system $102_S$ backed up at destination storage system $102_D$ may be configured to be in an immediate temporal past relative to a backup of the data to be restored to source storage system $102_S$ at destination storage system $102_D$ and in a temporal past relative to the common base data at destination storage system $102_D$.

Figure 7:
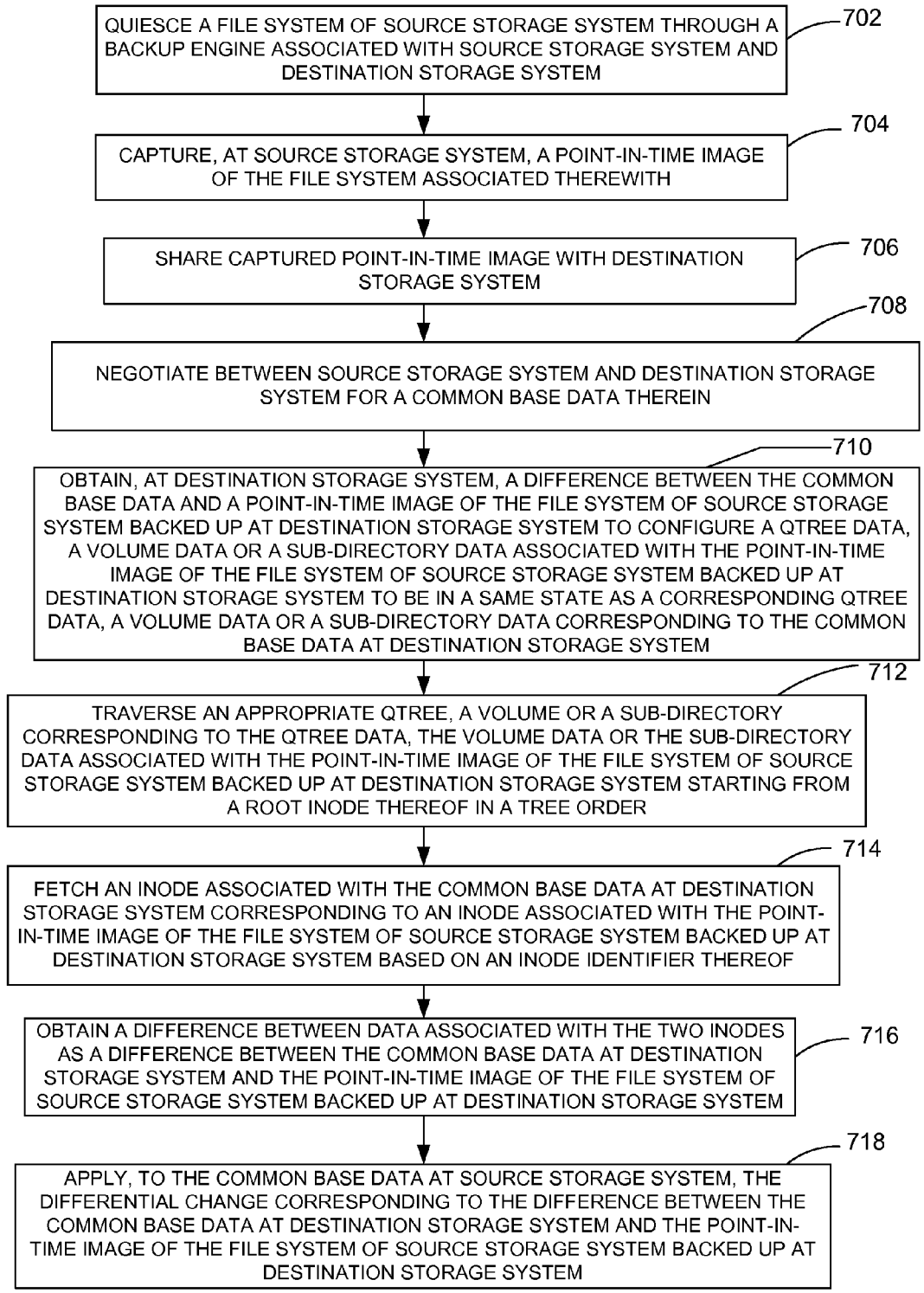
FIG. 7 is a process flow diagram detailing the operations involved in a method of performing an incremental restore of a differential data to a source storage system configured to have data associated therewith backed up at a destination storage system, according to one or more embodiments.

FIG. 7 shows a process flow diagram detailing the operations involved in a method of performing an incremental restore of a differential data to source storage system $102_S$ configured to have data associated therewith backed up at destination storage system $102_D$, according to one or more embodiments. In one or more embodiments, operation 702 may involve quiescing a file system associated with source storage system $102_S$ through a backup engine associated with source storage system $102_S$ and destination storage system $102_D$. In one or more embodiments, source storage system $102_S$ and destination storage system $102_D$ may have different storage operating systems associated therewith.

In one or more embodiments, operation 704 may involve capturing, at source storage system $102_S$, a point-in-time image of the file system associated therewith through the backup engine. In one or more embodiments, operation 706 may involve sharing the captured point-in-time image of the file system associated with source storage system $102_S$ with destination storage system $102_D$ to enable source storage system $102_S$ and destination storage system $102_D$ to have a common base data therein. In one or more embodiments, operation 708 may involve negotiating between source storage system $102_S$ and destination storage system $102_D$ for the common base data therein.

In one or more embodiments, operation 710 may involve obtaining, at destination storage system $102_D$, a difference between the common base data and a point-in-time image of the file system of source storage system $102_S$ backed up at destination storage system $102_D$ to configure a qtree data, a volume data or a sub-directory data associated with the point-in-time image of the file system of source storage system $102_S$ backed up at destination storage system $102_D$ to be in a same state as a corresponding qtree data, a volume data or a sub-directory data corresponding to the common base data at destination storage system $102_D$. In one or more embodiments, the point-in-time image of the file system of source storage system $102_S$ backed up at destination storage system $102_D$ may be configured to be in an immediate temporal past relative to a backup of data to be restored to source storage system $102_S$ at destination storage system $102_D$ and in a temporal past relative to the common base data at destination storage system $102_D$.

In one or more embodiments, operation 712 may involve traversing an appropriate qtree, a volume or a sub-directory corresponding to the qtree data, the volume data and the sub-directory data associated with the point-in-time image of the file system of source storage system $102_S$ backed up at destination storage system $102_D$ starting from a root inode thereof in a tree order. In one or more embodiments, operation 714 may involve fetching an inode associated with the common base data at destination storage system $102_D$ corresponding to an inode associated with the point-in-time image of the file system of source storage system $102_S$ backed up at destination storage system $102_D$ based on an inode identifier thereof.

In one or more embodiments, operation 716 may involve obtaining a difference between data associated with the two inodes as a difference between the common base data at destination storage system $102_D$ and the point-in-time image of the file system of source storage system $102_S$ backed up at destination storage system $102_D$. In one or more embodiments, operation 718 may then involve applying, to the common base data at source storage system $102_S$, the differential change corresponding to the difference between the common base data at destination storage system $102_D$ and the point-in-time image of the file system of source storage system $102_S$ backed up at destination storage system $102_D$.

Figure 8:
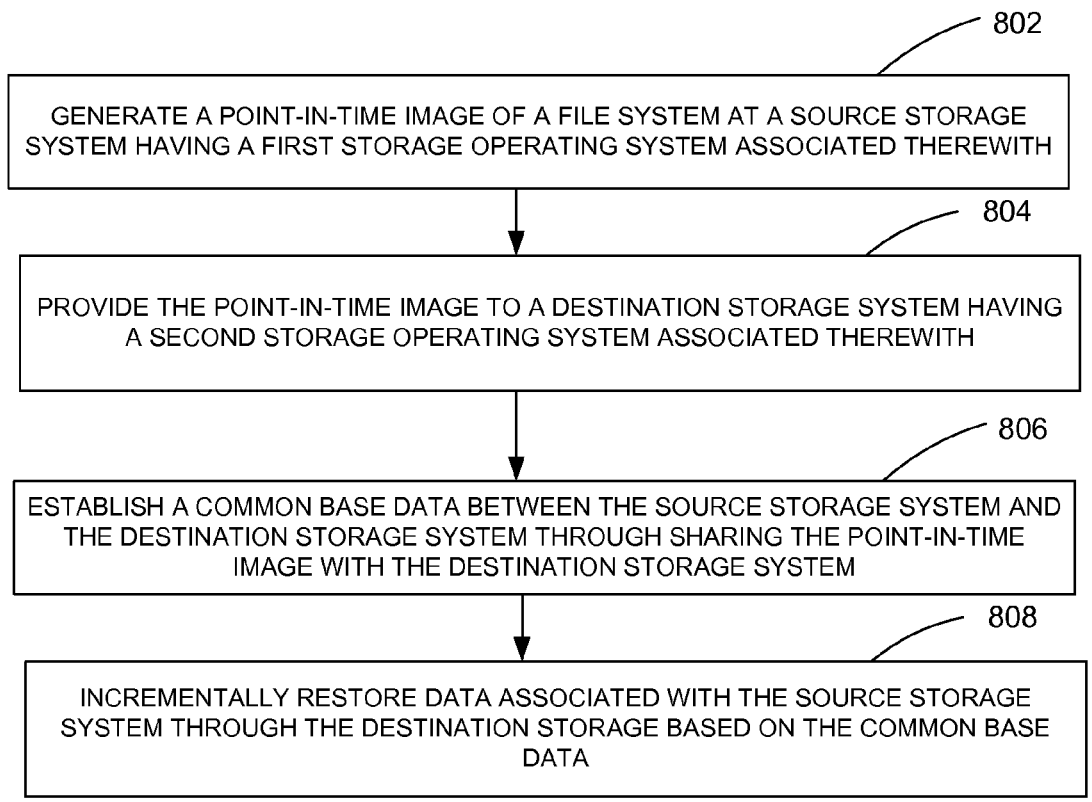
FIG. 8 is a process flow diagram detailing the operations involved in a method of restoring data between storage systems having different storage operating systems associated therewith based on a commonality of point-in-time images, according to one or more embodiments.

FIG. 8 shows a process flow diagram detailing the operations involved in a method of restoring data between storage systems (e.g., source storage system $102_S$ and destination storage system $102_D$) having different storage operating systems associated therewith based on a commonality of point-in-time images, according to one or more embodiments. In one or more embodiments, operation 802 may involve generating a point-in-time image of a file system at a source storage system having a first storage operating system associated therewith. In one or more embodiments, the source storage system may be configured to have data associated therewith backed up at a destination storage system having a second storage operating system associated therewith. In one or more embodiments, the first storage operating system may be configured to implement the file system at the source storage system.

In one or more embodiments, operation 804 may involve providing, through a computer network (e.g., network 106), the point-in-time image to the destination storage system. In one or more embodiments, the second storage operating system may be configured to implement a file system different from that implemented through the first storage operating system. In one or more embodiments, operation 806 may involve establishing a common base data between the source storage system and the destination storage system through sharing the point-in-time image with the destination storage system. In one or more embodiments, the common base data may be referenced by both the source storage system and the destination storage system based on an identification data.

In one or more embodiments, operation 808 may then involve incrementally restoring data associated with the source storage system through the destination storage system based on the common base data.

It should be noted that, in one embodiment, the destination storage system tagging snapshot identification data (e.g., snap IDs) to snapshots therein may force the source storage system also to use an identifier with respect to the point-in-time image therein (which is common to both the source storage system and the destination storage system). For example, as referenced previously, the source storage system may associate an identification (ID) data with the captured point-in-time image of the file system, analogous to a snapshot (snap) ID being used to tag snapshots in an operating system configured to support snapshots. In this example, the identification data may refer to the identifier of the point-in-time image captured at the source storage system. The destination storage system may use snap IDs with regard to snapshots therein (including the point-in-time image shared therewith).

Although the present embodiments have been described with reference to specific example embodiments, it will be evident that various modifications and changes may be made to these embodiments without departing from the broader spirit and scope of the various embodiments. Also, for example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Accordingly, the specification and drawings are to be regarded in an illustrative rather than a restrictive sense.

What is claimed is:

1. A method of restoring data between a source storage system managing data for a plurality of host devices and a destination storage system, comprising:

quiescing a file system associated with the source storage system associated with a first storage operating system through a backup engine associated with the source storage system and the destination storage system associated with a second storage operating system, the source storage system being configured to have data associated with the source storage system backed up at the destination storage system, and the second storage operating system being configured to implement a file system different from the file system implemented through the first storage operating system;

capturing, at the source storage system, a point-in-time image, a snapshot of the file system associated with the source storage system through the backup engine;

sharing the captured point-in-time image of the file system associated with the first storage operating system of the source storage system with the destination storage system to enable the source storage system and the destination storage system to have a common base data;

negotiating between the source storage system and the destination storage system for the common base data, wherein during the negotiating, the destination storage system sends a list of point-in-time images to the source storage system and the source storage system uses the sent list to obtain the common base data; and applying, to the common base data at the source storage system, a differential change corresponding to a difference between the common base data at the destination storage system and a point-in-time image of the file system of the source storage system backed up at the destination storage system, the point-in-time image of the file system of the source storage system backed up at the destination storage system being configured to be in an immediate temporal past relative to a backup of the data to be restored to the source storage system at the destination storage system and in a temporal past relative to the common base data at the destination storage system.

2. The method of claim 1, further comprising remotely triggering, through an appropriate interlace at the source storage system, an update associated with the backup engine through the destination storage system, the update being configured to enable the quiescing the file system associated with the source storage system.

3. The method of claim 1, wherein the capturing the point-in-time image of the file system associated with the source storage system includes at least one of a process comprising:
capturing a series of point-in-time images of the file system of the source storage system prior to the quiescing; and
selecting an immediate previous point-in-time image of the file system prior to the quiescing as the point-in-time image of the file system at the source storage system following the quiescing; and
momentarily holding on to the selected immediate previous point-in-time image of the file system at the source storage system.

4. The method of claim 1, wherein the negotiating between the source storage system and the destination storage system for the common base data includes:
transmitting, to the source storage system, a series of point-in-time images associated with temporal back up of the file system of the source storage system at the destination storage system; and
selecting the common base data from the transmitted series of point-in-time images.

5. The method of claim 1, further comprising copying, at the source storage system, data associated with the file system to another location to enable a backup.

6. The method of claim 1, further comprising obtaining, at the destination storage system, the difference between the common base data and the point-in-time image of the file system of the source storage system backed up at the destination storage system to configure one of a quota tree data, a volume data and a sub-directory data associated with the point-in-time image of the file system of the source storage system backed up at the destination storage system to be in a same state as a corresponding one of a quota tree data, a volume data and a sub-directory data corresponding to the common base data at the destination storage system.

7. The method of claim 6, wherein the obtaining the difference between the common base data and the point-in-time image of the file system of the source storage system backed up at the destination storage system includes:

traversing an appropriate one of a quota tree, a volume and a sub-directory corresponding to the corresponding one of the quota tree data, the volume data and the sub-directory data associated with the point-in-time image of the file system of the source storage system backed up at the destination storage system starting from a root inode in a tree order;
fetching an inode associated with the common base data at the destination storage system corresponding to an inode associated with the point-in-time image of the file system of the source storage system backed up at the destination storage system based on an inode identifier; and
obtaining a differential data between the inode associated with the common base data at the destination storage system and the inode associated with the point-in-time image of the file system of the source storage system backed up at the destination storage system.

8. The method of claim 7, further comprising transmitting an attribute incompatible with the destination storage system based on the associated second storage operating system as is to the source storage system, the attribute being associated with the data to be restored to the source storage system.

9. The method of claim 1, wherein the source storage system and the destination storage system are configured to communicate with each other through a network.

10. The method of claim 1, wherein the storage operating system associated with the destination storage system is configured to support a data set associated with at least one of a Network File System (NFS) protocol, a Common Internet File System (CIFS) protocol, an Internet Small Computer System Interface (iSCSI) protocol, a Hypertext Transfer Protocol (HTTP), a File Transfer Protocol (FTP), an FTP-Secure (FTPS) protocol, a Secure File Transfer Protocol (SFTP), and a Network Data Management Protocol (NDMP).

11. The method of claim 1, wherein the file system of the destination storage system is a "write anywhere" file system.

12. A method of incrementally restoring differential data between a source storage system managing data for a plurality of host devices and a destination storage system, comprising:
quiescing a file system associated with a the source storage system associated with a first storage operating system through a backup engine associated with the source storage system and the destination storage system associated with a second storage operating system, the source storage system being configured to have data associated with the source storage system backed up at the destination storage system, and the second storage operating system being configured to implement a file system different from the file system implemented through the first storage operating system;
capturing, at the source storage system, a point-in-time image, a snapshot of the file system associated with the source storage system through the backup engine;
sharing the captured point-in-time image of the file system associated with the first storage operating system of the source storage system with the destination storage system to enable the source storage system and the destination storage system to have a common base data;
negotiating between the source storage system and the destination storage system for the common base data; wherein during the negotiating, the destination storage system sends a list of point-in-time images to the source storage system and the source storage system uses the sent list to obtain the common base data;
obtaining, at the destination storage system, a difference between the common base data and a point-in-time image of the file system of the source storage system backed up at the destination storage system to configure one of a quota tree data, a volume data and a sub-directory data associated with the point-in-time image of the file system of the source storage system backed up at the destination storage system to be in a same state as a corresponding one of a quota tree data, a volume data and a sub-directory data corresponding to the common base data at the destination storage system, the point-in-time image of the file system of the source storage system backed up at the destination storage system being configured to be in an immediate temporal past relative to a backup of data to be restored to the source storage system at the destination storage system and in a temporal past relative to the common base data at the destination storage system;

traversing an appropriate one of a quota tree, a volume and a sub-directory corresponding to the corresponding one of the quota tree data, the volume data and the sub-directory data associated with the point-in-time image of the file system of the source storage system backed up at the destination storage system starting from a root inode in a tree order;

fetching an inode associated with the common base data at the destination storage system corresponding to an inode associated with the point-in-time image of the file system of the source storage system backed up at the destination storage system based on an inode identifier;

obtaining a difference between data associated with the inode associated with the common base data at the destination storage system and the inode associated with the point-in-time image of the file system of the source storage system backed up at the destination storage system as a difference between the common base data at the destination storage system and the point-in-time image of the file system of the source storage system backed up at the destination storage system; and applying, to the common base data at the source storage system, a differential change corresponding to the obtained difference between the common base data at the destination storage system and the point-in-time image of the file system of the source storage system backed up at the destination storage system.

13. The method of claim 12, further comprising remotely triggering, through an appropriate interface at the source storage system, an update associated with the backup engine through the destination storage system, the update being configured to enable the quiescing the file system associated with the source storage system.

14. The method of claim 12, wherein the capturing the point-in-time image of the file system associated with the source storage system includes at least one of: a process including:

capturing a series of point-in-time images of the file system of the source storage system prior to the quiescing; and selecting an immediate previous point-in-time image of the file system prior to the quiescing as the point-in-time image of the file system at the source storage system following the quiescing; and momentarily holding on to the selected immediate previous point-in-time image of the file system at the source storage system.

15. The method of claim 12, wherein the negotiating between the source storage system and the destination storage system for the common base data includes:

transmitting, to the source storage system, a series of point-in-time images associated with temporal back up of the file system of the source storage system at the destination storage system; and selecting the common base data from the transmitted series of point-in-time images.

16. The method of claim 12, further comprising copying, at the source storage system, data associated with the file system to another location to enable a backup.

17. The method of claim 12, wherein the source storage system and the destination storage system are configured to communicate with each other through a network.

18. The method of claim 12, wherein the storage operating system associated with the destination storage system is configured to support a data set associated with at least one of a Network File System (NFS) protocol, a Common Internet File System (CIFS) protocol, an Internet Small Computer System Interface (iSCSI) protocol, a Hypertext Transfer Protocol (HTTP), a File Transfer Protocol (FTP), an FTP-Secure (FTPS) protocol, a secure file transfer protocol (SFTP) and a Network Data Management Protocol (NDMP).

19. The method of claim 12, wherein the file system of the destination storage system is a "write anywhere" file system.

20. The method of claim 12, further comprising transmitting an attribute incompatible with the destination storage system based on the associated second storage operating system as is to the source storage system, the attribute being associated with the data to be restored to the source storage system.

21. A storage environment configured to enable an incremental data restore comprising:

a source storage system associated with a first storage operating system; and a destination storage system configured to back up data associated with the source storage system, the destination storage system associated with a second storage operating system, the destination storage system comprising a processor and a memory, and the second storage operating system being configured to implement a file system different from a file system implemented through the first storage operating system, wherein the memory includes storage locations configured to be addressable by the processor, wherein the memory is configured to store instructions associated with a backup engine associated with the source storage system and the destination storage system, and wherein the backup engine is configured to enable:

quiescing the file system associated with the source storage system, capturing, at the source storage system, a point-in-time image, a snapshot, of the file system associated with the source storage system;

sharing the captured point-in-time image of the file system associated with the first storage operating system of the source storage system with the destination storage system to enable the source storage system and the destination storage system to have a common base data;

negotiating between the source storage system and the destination storage system for the common base data, wherein during the negotiating, the destination storage system sends a list of point-in-time images to the source storage system and the source storage system uses the sent list to obtain the common base data; and applying, to the common base data at the source storage system, a differential change corresponding to a difference between the common base data at the destination storage system and a point-in-time image of the file system of the source storage system backed up at the destination storage system, the point-in-time image of the file system of the source storage system backed up at the destination storage system being configured to be in an immediate temporal past relative to a backup of the data to be restored to the source storage system at the destination storage system and in a temporal past relative to the common base data at the destination storage system.

22. The storage environment of claim 21, wherein the source storage system comprises an appropriate interface configured to remotely trigger an update associated with the backup engine through the destination storage system, the update being configured to enable the quiescing the file system associated with the source storage system.

23. The storage environment of claim 21, wherein the backup engine is configured to enable capturing the point-in-time image of the file system associated with the source storage system through at least one of a process including:
  capturing a series of point-in-time images of the file system of the source storage system prior to the quiescing thereof; and
  selecting an immediate previous point-in-time image of the file system prior to the quiescing as the point-in-time image of the file system at the source storage system following the quiescing; and
  momentarily holding on to the selected immediate previous point-in-time image of the file system at the source storage system.

24. The storage environment of claim 21, wherein the backup engine is configured to enable negotiating between the source storage system and the destination storage system for the common base data through:
  transmitting, to the source storage system, a series of point-in-time images associated with temporal back up of the file system of the source storage system at the destination storage system; and
  selecting the common base data from the transmitted series of point-in-time images.

25. The storage environment of claim 21, wherein data associated with the file system of the source storage system is copied at the source storage system to another location to enable a backup.

26. The storage environment of claim 21, wherein the backup engine is further configured to enable:
  obtaining, at the destination storage system, the difference between the common base data and the point-in-time image of the file system of the source storage system backed up at the destination storage system to configure one of a quota tree data, a volume data and a sub-directory data associated with the point-in-time image of the file system of the source storage system backed up at the destination storage system to be in a same state as a corresponding one of a quota tree data, a volume data and a sub-directory data corresponding to the common base data at the destination storage system.

27. The storage environment of claim 26, wherein the backup engine is configured to enable obtaining the difference between the common base data and the point-in-time image of the file system of the source storage system backed up at the destination storage system through:
  traversing an appropriate one of a quota tree, a volume and a sub-directory the corresponding to the corresponding one of the quota tree data, the volume data and the sub-directory data associated with the point-in-time image of the file system of the source storage system backed up at the destination storage system starting from a root inode in a tree order;
  fetching an inode associated with the common base data at the destination storage system corresponding to an inode associated with the point-in-time image of the file system of the source storage system backed up at the destination storage system based on an inode identifier; and
  obtaining a differential data between the inode associated with the common base data at the destination storage system and the inode associated with the point-in-time image of the file system of the source storage system backed up at the destination storage system.

28. The storage environment of claim 27, wherein an attribute incompatible with the destination storage system based on the associated second storage operating system is configured to be transmitted as is to the source storage system, the attribute being associated with the data to be restored to the source storage system.

29. The storage environment of claim 21, wherein the source storage system and the destination storage system are configured to communicate with each other through a network.

30. The storage environment of claim 29, wherein the network is at least one of a storage area network (SAN), a local area network (LAN), a wide area network (WAN), a virtual private network (VPN) and Internet.

31. The storage environment of claim 21, wherein the storage operating system associated with the destination storage system is configured to support a data set associated with at least one of a Network File System (NFS) protocol, a Common Internet File System (CIFS) protocol, an Internet Small Computer System Interface (iSCSI) protocol, a Hypertext Transfer Protocol (HTTP), a File Transfer Protocol (FTP), an FTP-Secure (FTPS) protocol, a secure file transfer protocol (SFTP) and a Network Data Management Protocol (NDMP).

32. The storage environment of claim 21, wherein the file system of the destination storage system is a "write anywhere" file system.

33. A method of restoring data between storage systems associated with different operating systems based on a commonality of point-in-time images, comprising:
  generating a point-in-time image, a snapshot, of a file system at a source storage system associated with a first storage operating system, the source storage system being configured to have associated data backed up at a destination storage system associated with a second storage operating system, the first storage operating system being configured to implement the file system at the source storage system, and the second storage operating system being configured to implement a file system at the destination storage system different from that implemented through the first storage operating system;
  providing, through a computer network, the generated point-in-time image to the destination storage system;
  negotiating between the source storage system and the destination storage system for a common base data, wherein during the negotiating, the destination storage system sends a list of point-in-time images to the source storage system and the source storage system uses the sent list to obtain the common base data;
  establishing the common base data between the source storage system and the destination storage system through sharing the generated point-in-time image with the destination storage system, the common base data being referenced by both the source storage system and the destination storage system based on identification data of common data between both using the sent list; and incrementally restoring data associated with the source storage system through the destination storage system based on the established common base data.

34. The method of claim 33, further comprising:

quiescing the file system associated with the source storage system through a backup engine associated with the source storage system and the destination storage system prior to the generating the point-in-time image, the point-in-time image being captured through the backup engine.

\* \* \* \* \*